United States Patent [19]

Crockett et al.

[11] Patent Number: 4,837,680

[45] Date of Patent: Jun. 6, 1989

[54] CONTROLLING ASYNCHRONOUSLY OPERATING PERIPHERALS

[75] Inventors: Robert N. Crockett; Robert F. Kern; Arnold G. Miller; Richard E. Norris; Michael W. Pousson, Jr.; Robert E. Wagner, all of Tucson, Ariz.

[73] Assignee: International Business Machines Corporation, Armonk, N.Y.

[21] Appl. No.: 90,722

[22] Filed: Aug. 28, 1987

[51] Int. Cl.[4] .............................................. G06F 3/00
[52] U.S. Cl. ................................. 364/200; 364/228.1; 364/228.3
[58] Field of Search .................... 364/200, 309, 900

[56] References Cited

U.S. PATENT DOCUMENTS 4,396,984  8/1983  Videki ................................ 364/200

*Primary Examiner*—Raulfe B. Zache

*Attorney, Agent, or Firm*—Manny W. Schecter

[57] ABSTRACT

A plurality of host processors share access to a peripheral data storage subsystem and each have program means for controlling asynchronous operations of the subsystem. Control blocks in each of the host processors are addressably linked together for enabling inferred access to a unit control block (UCB) for any of a plurality of peripheral devices in the subsystem. The subsystem selectively groups some of the devices such that only devices designated as primary devices are addressably accessible by host processor application programs. Other devices in the respective groups are secondary devices and are accessed by the subsystem whenever the primary devices in the same group cannot perform a host processor commanded operation. Means are provided for identifying the secondary devices to all of the host processors.

6 Claims, 3 Drawing Sheets

CONTROLLING ASYNCHRONOUSLY OPERATING PERIPHERALS

DOCUMENTS INCORPORATED BY REFERENCE

IBM System/360 and System/370 I/O Interface Channel to Control Unit Original Equipment Manufacturer's Information, IBM Document GA22-6974, File S360-S370-19, pages 13, 14, 21-28, 1978.

U.S. Pat. 4,574,346, Hartung, entitled Method and Apparatus for Peripheral Date Handling Hierachies.

Commonly Assigned co-pending application, for patent Ser. No. 089,151, filed Aug. 25, 1987.

FIELD OF THE INVENTION

The present invention relates to data processing systems, particularly to those systems employing asynchronous peripheral or input/output operations.

BACKGROUND OF THE INVENTION

The state of the art in the above-stated field includes U.S. Pat. No. 3,716,837 to Waddell, which shows broadcasting an untaggged interrupt signal from a peripheral system to a plurality of connected host processors. Any one of the connected host processors can respond to the broadcast untagged interrupt. This patent does not relate to a synchronous status between the various processors, rather it is directed primarily to broadcasting an untagged interrupt for handling by a first available host processor for servicing an attached peripheral data processing subsystem.

U.S. Pat. No. 3,670,307 to Arnold et al., shows a data storage subsystem which operates internally asynchronous to program execution in any of a plurality of attached host processors. Each of the input/output ports of the peripheral subsystem, as explained in column 7 of this patent, has a queue storing the received request from the various host processors. The subsystem then executes the received requests based upon its own program determined execution procedures independent of synchronization with the host processors. Host processor programs are not shown by Arnold et al. for establishing configuration data of the subsystem for such attached host processors, nor are the details of how the host processors may manage such asynchronous operations shown.

Byrns, U.S. Pat. No. 4,594,657, shows two asynchronously operating microprocessors. The microprocessors share status information about a shared memory using so-called semaphores. The semaphores, in turn, are used by program means for arbitrating access to the shared resource, a data storage unit or memory. This patent does not address management of such memory accesses nor the operation of such a memory asynchronously to the host processor program execution. It is to be appreciated that Byrns apparently operates the memory synchronously with respect to the two microprocessors, (equivalent of host processors) as is usual.

Neches et al., U.S. Pat. No. 4,412,285, also employ semaphores in a multiple processor environment. A single query or request is supplied from a peripheral system to all of the processors for determining readiness of a network. A well known "test and set" instruction or query is sent to all of the processors for determining the state of readiness of the network. While the broadcasting of a query to all units is shown, the management of asynchronous operations is not disclosed.

Schlaeppi, U.S. Pat. No. 3,480,914, shows "interaction units" connected to respective processors and to each other for operating indepdently from the host processors for avoiding interrupting host processor operation. The interaction processors appear to provide status information transfer as well as synchronizing operation of the multiple processor setup.

Frieder et al, U.S. Pat. No. 4,527,237, show a set of tightly coupled processors (tightly coupled implies synchronous operation) sharing a main memory. An I/O and supervisory processor are coupled to the main memory and to the various host processors for enabling the main memory to imply different data and control structures from the execution (host) and I/O processors. Status information is exchanged between the units. Because of the close operative association of the various units, it is believed that the operation is entirely synchronous; hence does not apply to managing an asynchronous set of peripheral devices.

Dirac, U.S. Pat. No. 3,405,394, teaches that a bit pattern can show access status of various units. Bit patterns are supplied by the various units and sensed by other units to determine when and how to access the diverse units within a multiple unit setup. Since access control is the main concern of this reference, it does not go into whether or not asynchronous operations are used. It does show that the transfer of bit patterns identify the status of a plurality of units within a data processing system.

Lorie et al., U.S. Pat. No. 4,445,197, show weakly synchronized multiple processors which coordinate their operations. An access priority system manages the system. This reference does not show the management of asynchronous management of a subsystem.

U.S. Pat. No. 4,099,235 shows a two-processor telephone switching node. Distribution of the processor loads between the two processors is based upon load measurements, i.e., it is a load balancing system. All the telephone operations are asynchronous with respect to each other. The patent appears to be directed solely to load management, and not to the management of the various status of the telephone calls going through the switching central as contemplated by the management techniques of this invention.

Based upon all of the above and the current trends in the data processing environments toward greater asynchronous operations between multiple units in a data processing environment, there is a clear need for the management and control of asynchronous operations, including the asynchronous reporting of configuration and peripheral device-state transitions or changes. All of the above should use program means for maximum efficiency and the transfer of status information to all concerned processing units.

The IBM Publication IBM System/360 and System/370 I/O Interface Channel to Control Unit Original Equipment Manufacturers' Information, supra, shows a connection between a control unit and a host processor with which the present invention may be advantageously employed. Of particular interest is the "attention signal" described on page 24. The attention signal is generated by the control unit when some asynchronous condition occurs in an I/O device. Attention is not associated with the initiaion, execution or termination of any I/O operation. Each I/O device shared between more than one channel path presents any attention status to all channel paths. Presentation of the attention signal by the peripheral control unit causes command chaining of the channel to the control unit to be suppressed. The attention signal can occur with other signals, including "device end". Device end is described on page 24 of the manual and results from either the completion of an I/O operation at the I/O device level or from changing the device operational state, such as from not ready to ready. Depending upon the environment in which the device end signal is supplied, it can have any one of several meanings to the connected channel; hence host processor. Device end is also presented whenever there is not a ready to ready transition of the device; such as, going from an unloaded to loaded condition of a magnetic tape drive, card equipment out of cards or stacker full, a printer out of paper, error conditions requiring human intervention or the status of the I/O device is changed from an enabled to disabled state.

A third signal described on page 27 of the referenced manual is "unit exception". Unit exception means that the identified I/O device detected an unusual peripheral condition, such as end of file. Generally a unit exception signal has only one meaning for any particular command or type of I/O device. Usually a "sense" operation by the host processor is not required as a response to the acceptance of a unit exception condition. Generally, the unit exception condition relates to some activity associated with an I/O operation or the condition is of immediate significance to the data processing environment for disk storage devices.

It has been a practice to combine the unit exception, device end and attention signals for indicating to the host processor that a "pack change interrupt" has occurred; that is, such as on the IBM 2314, 3330 disk drives, removably mounted disks were removed from such a disk drive. When the disks are removed from the drive, a pack change is defined as occurring. When any of the disk drives detect such a pack change, then the three signals, unit exception, attention and device end are simultaneously broadcast to the connected host processors. The host processors respond to such a broadcast set of signals to "sense" the volume then currently on the device to identify it.

SUMMARY OF THE INVENTION

It is an object of the present invention to provide for improved and more flexible management and control of asynchronous peripheral operations.

An important aspect of the present invention relates to managing a peripheral subsystem, such as a data storage subsystem employing disk drives, attachable to one or more host processors. The subsystem preferably has a plurality of addressable peripheral devices connected to a shared program control or program control unit. The control unit in turn is attached to various host processors. Status and configuration means in the subsystem are operatively connected to the peripheral devices and to the program control for retentively storing configuration data for the subsystem. Such stored configuration data includes grouping predetermined ones of the peripheral devices into groups, such as pairs, with each said group having a primary device and at least one secondary device. Means in the program control maintain addressability of each primary device to the host processors and make addressability for each of the secondary devices limited to first addressing the primary device in the respective groups. The host processors do not have, through their own generation means, the addresses of the secondary peripheral devices. At times it is important for the host processor to know the addresses of the secondary devices in the respective groups of peripheral devices. Command execution means in the program control have means for actuating the secondary devices in any one of the groups to emit "device-state transition signals" to all of the connected host processors as an indication that such secondary devices are in the same group as a given primary device of the group. A host processor may institute such activity by requesting, through an asynchronous command, the identification of the peripheral devices in a group by sending a request addressed to the primary device of the respective group. Means in the program control transfer the device-state transition signal from the unaddressed secondary peripheral device to all of the connected host processors.

Asynchronous operations employed in the subsystem and managed in the host processor include setting the subsystem mode into any one of a large plurality of modes and performing subsystem functions. Subsystem functions in the data storage subsystem relate to manner and the status of data committed to the data storage subsystem by any one or more of the connected host processors. Subsystem functions also include performance of unrelated operations for controlling access to the various peripheral devices. Error handling is also provided on an asynchronous basis.

The foregoing and other objects, features, and advantages of the invention will be apparent from the following more particular description of preferred embodiments of the invention, as illustrated in the accompanying drawings.

BRIEF DESCRIPTION OF THE DRAWING

FIG. 3 is a detailed showing of two of the FIG. 2 illustrated control tables.

DESCRIPTION OF THE ILLUSTRATIVE EMBODIMENTS

Figure 1:
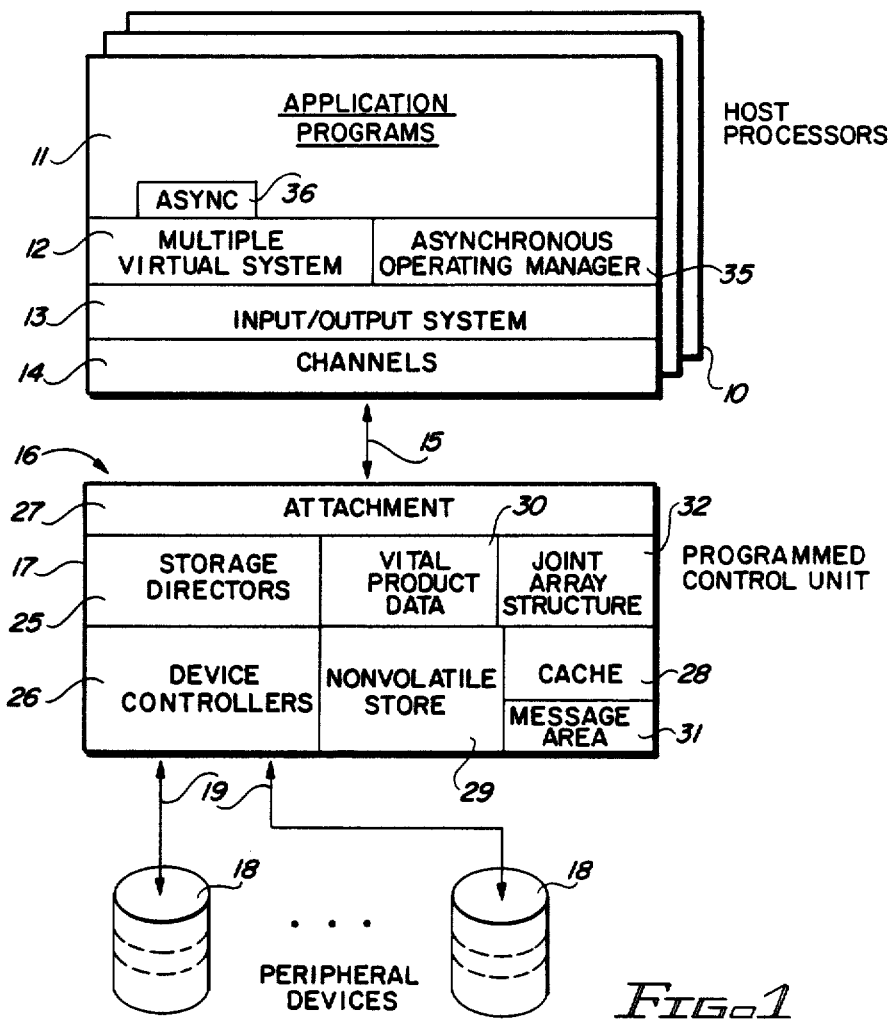
FIG. 1 is a simplified showing of a data processing system using the present invention.

Referring now more particularly to the drawing like numerals indicate like parts and structural features in the various diagrams. FIG. 1 shows a plurality of host processors 10 which are loosely coupled, i.e., operate substantially independently of each other. Within each of the host processors 10 are sets of dynamically varying application programs 11 which provide the host processors 10 the means for doing useful work in a data processing enviroment. Such application programs 11 are subservient to and are managed by an operating system, Multiple Virtual System (MVS) 12. MVS 12 is a multiple virtual system sold by IBM and usable in IBM's larger host processors. Operatively connected to MVS 12 is the operating system input/output system IOS 13.

IOS 13 and MVS 12 share a set of control tables known to the industry and not shown in the present application for purposes of brevity. Such control tables are not necessary for an understanding of the present invention. A plurality of programmable channels 14 are accessible through IOS 13 for transferring data commands and status signals over attaching means 15 between any of the host processors 10 and one or more peripheral subsystems 16.

The illustrated peripheral subsystem 16 consists of a programmed control unit 17 attaching a plurality of disk storage devices (direct access storage device—DASD) 18 through attachment cables represented by double-headed arrows 19. Programmed control unit 17 provides for data communications between the various host processors 10 and peripheral devices 18. Programmed control unit 17 also handles and maintains status information concerning subsystem 16, as well as configuration data. Each programmed control unit 17 can include one or more storage directors 25. Each storage director 25 includes a programmed microprocessor (not shown) having programming, as is well known, for managing the data transfers between host processors 10 and devices 18. Associated with the storage director 25 are automatic data transfer circuits (not shown) as is well known. Storage director 25 communicates with devices 18 through a set of respective device controllers 26, the device controllers being constructed in a usual manner. A set of attachment circuits 27 provide for interface communication with the channels 14 of the respective host processors 10, such as described in the OEMI manual, supra.

The programmed control unit 17 can include a relatively large subsystem random access data store which is logically divided into a plurality of portions. A cache 28 comprises the largest portion of subsystem store and is used for buffering or caching data being transferred between the host processors 10 and the devices 18. A portion of the subsystem store can be used as a nonvolatile store (NVS) (battery powered portion of the store) as indicated at NVS 29. NVS 29 is used in connection with a fast write operation wherein the subsystem 16 signals the data supply and host processors 10 that the received data is committed for retentive storage in the subsystem as opposed to nonretentive storage, all as shown in the Hartung patent, supra. Additionally, vital product data (VPD) is retentively stored in programmed control unit 17. NVS 29 and VPD 30 are preferably semiconductor memory portion of the subsystem store with a battery backup for guaranteeing retentivity. A message area, MSG 31, provides for communications between a plurality of storage directors 25. Additionally, a plurality of programmed control units 17 may be intercoupled with MSG 31 for MSG 31 as message transfer storage areas. A program control for effecting such programmed transfers is well known and not described for that reason. To assist in managing asynchronous operation of the program control unit and subsystem 16 with respect to the host processors 10, a joint array structure JAS 32 is provided in the subsystem store. Storage directors 25 maintain the current status of JAS 32, as will become apparent. JAS 32 provides the synchronizing point of ensuring subsystem integrity when the subsystem 16 is executing a variety of asynchronous operations on behalf of host processors 10.

Each of the host processors 10 includes an asynchronous operating manager (AOM) 35 provides for management and control of the asynchronous operations conducted within subsystem 16. AOM 35 includes a set of its own control tables "async" 36 within the main memory of the respective host processors 10. When a device-state transition or a subsystem 16 mode change occurs independently of the operation of the host processors 10, or in response to a request from any one of the host processors 10, the subsystem 16 simultaneously supplies an attention signal, a device end signal and a unit exception signal (collectively a devicestate transistion signal) to all of the connected host processors. The host processors respond to such devicestate transition signal for making inquiries of the subsystem 16 to determine its changed status. In this manner, a subsystem 16 instituted configuration or operational change which is of immediate significance to the continued successful operation of host processors 10 is effectively transmitted to all of the host processors 10 with minimal program intervention.

One of the features of subsystem 16 is the pairing of two or more of the peripheral devices 18. Pairing is defined as a group of such devices in which one and only one of the devices within each group is a primary device. Each primary device is addressable by any of the host processors 10 through addresses generated by the host processor 10 as enabled at SYSGEN (system generation) time in the data processing environment. The other devices within the device group are secondary devices and are not addressable by the host processor using addresses based upon system generation. Rather, when a host processor accesses a primary device and that device is not available, or has error conditions, then programmed control unit 17, acting through one of its storage directors 25, accesses a secondary device for performing the requested data processing function. Such access to the secondary device is not known to any of the connected host processors, rather the operation is completed as if the primary device within the group were successfully operating.

For purposes of system integrity and control, it is desirable to identify all of the devices within each group within a host processor 10. This identification resides in a unit control block (UCB) constructed in the host processor memory for each of the devices in the data processing environment. Any device 18 which is not a member of the group is in a "simplex" mode of operation. The devices which are members of a group, whether primary or secondary, are said to be in a "duplex" mode of operation. In a data storage enviroment, a duplex mode of operation indicates the same data is stored in each of two devices which are members of the group, no limitation to two devices being intended. The referenced co-pending related patent application, TU986013, shows management of a group of devices, termed "duplexpaired" devices, within a subsystem 16.

By definition, data is stored in volumes. Each volume can be a logical address space (virtual volume) or a peripheral address space (real volume). That is, the volume is an address range used by the host processors 10 for addressing data stored in devices 18. In the case of a real volume, each device 18 usually contains one volume. In the case of virtual volumes, each of the devices 18 contain a relatively large plurality of virtual volumes. Virtual volumes may appear as real volumes to host processors 10 in certain circumstances. Any of the host processors 10 can send a subsystem mode command to the programmed control unit 17 for changing the volume status, real or virtual, from a simplex to a duplex mode or from duplex to simplex mode. When subsystem 16 changes device 18 status between simplex and duplex modes, all of the devices within the group report to all host processors 10 using the above-described devicestate transition signal. The host processors 10 respond to such a broadcast of device-state transistion signals to query the sending devices for updating the respective UCB's.

Error conditions can change the status of a volume from a duplex mode to a failed duplex mode, i.e., one of the devices in the group has failed. In this case, one of the storage directors 25, if capable, supply device-state transition signals to all of the host processors 10.

Similar action occurs when the status of the group changes from failed duplex to duplex, i.e., operator intervention or automatic diagnostics may have uncovered the error and caused reinstituion of a duplex mode. Included in the error recovery is the reassignment of another device 18 into the failed group. For example, if a primary device in the group fails, then the secondary provides all of the data storage and other related operations on behalf of the group for the benefit of the host processors 10. An operator may assign another device 18 outside of the group to be the primary device within the group. In such a reassignment, or reconfiguration, data of the volume stored on the secondary device is transferred to the primary device. When that transfer is completed, then a device-state transition signal is sent to all of the host processors 10. Another reportable event is the reassignment of device addresses by a reestablished duplex pair command received from a host processor 10. In a similar manner, a fast write status of NVS 29 can change, based upon availability of that portion of the subsystem store. Likewise, availability of cache 28 is a significant status change such that all of the devices having a cache operating mode report the cache status change to the host processors 10. When nonretentive data (NRD) mode, as described in Hartung, supra, is employed, that status change is also reported in a device-state transition signal. It should be noted that device addresses not only include the physical peripheral device 18, but also allocated portions of cache 28 and NVS 29 that relate to such physical device.

Another host processor 10 requested operation to be managed in accordance with the present invention is where all of the devices in a group, which are not a primary device, are to be identified by a device-state transition signal sent to the host processor 10 by a storage director 25. This operation indicates to all of the host processors 10 which of the devices 18 are secondary devices in the group of devices to which the request was sent, i.e., the primary device. In the last example, only the secondary device or devices of the group supply the device-state transition signal. In all of the status changes for the cache 28, NVS 29, etc. only one device need send the device-state transition signal. All of the above-described events are reported as a device-state transition signal to all host processors 10 asynchronously. The host processors 10 respond to the device-state transition signal to update tables in AOM 35 as will become apparent.

The response of a host processor 10 to a device-state transition signal is by sending a series of commands in a chain of commands of sensing the ID of the interrupting device, reading the device characteristics, reading configuration data, and then sensing subsystem status. The devicestate transition signal therefore is a broad indicator to all of the host processors 10 that some status or mode of subsystem 16 has changed and is of immediate significance to the continued operation of all host processors 10.

In a constructed embodiment of the present invention, the application program 11, when sending a command to subsystem 16 commanding an asynchronous operation, supplies the command through MVS 12 and IOS 13 in the usual manner. Additionally, the application program 11 request to IOS 13 supplies a signal to AOM 35 that an asynchronous input/output has been issued for which an attention signal and associated message has been requested from subsystem 16. Such an arrangement is useful when the percentage of asynchronous operations is relatively modest. When a large percentage of the input/output operations between host processors 10 and a subsystem 16 are asynchronous, then the asynchronous mode of operation can be more effectively managed by MVS 12, IOS 13 in combination with AOM 35. In the latter arrangement, the application program 11 requesting a command to be sent to a subsystem 16 uses a chain of channel command words "CCW's" in an input-output channel program of host processor 10. This chain is scanned by IOS 13 for determining whether or not an asynchronous operation is being requested. Then IOS 13 notifies AOM 35 of each asynchronous command. By having the application programs 11 notify AOM 35, such CCW chain scanning is dispensed with.

The two types of asynchronous operations described in the present embodiment are the set subsystem mode and perform subsystem function commands. In the system management of asynchronous operations, the asynchronous CCWs have to be in a predetermined order within a chain of CCWs, otherwise, a "unit check" occurs (error condition). A form of the command "perform subsystem function" is described in the Hartung patent, supra as the "ERC" and "EUA"commands. In addition to the functions described by Hartung, a new field is added to the command. Such field is in a so-called flag byte and consists of two bits. The values of the field and their meanings are: 00=no action, may be invalid for some commanded operations; 01=use primary device of the addressed group (addressing the group is achieved by addressing the primary device) for all of the ensuing commands in the current chain of commands; 10=use the secondary device in the addressed group; and 11=broadcast the device-state transition signal to all of the connected host processors using the secondary device (DS) as the indicated source device. The 11 value is the mechanism used in connection with the present invention for identifying the secondary device to connected host processors.

Figure 2:
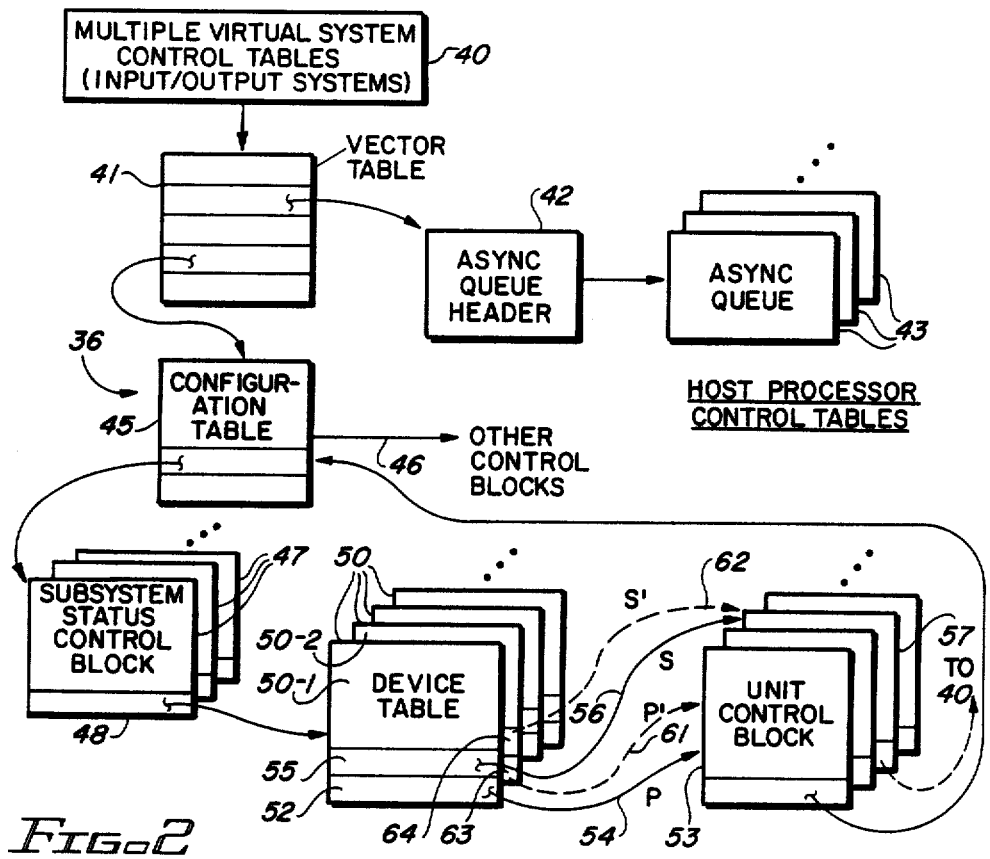
FIG. 2 illustrates control tables for a host processor employing the present invention.

Referring now to FIG. 2, various host processors 10 control tables are described. The FIG. 2 illustrated tables are those tables sufficient for reaching an understanding of the present invention. The operating system, MVS 12, includes a plurality of control tables 40, most of which are not of interest to the present description. Included in those control tables 40 are tables that are accessed and controlled by input/output system IOS 13. Whenever subsystem 16 supplies a device-state transition signal to a host processor 10, IOS 13 is the first program to process the received signal received via channel 14. IOS 13 is programmed to recognize a device-state transition signal and also recognize that AOM 35 has capability of handling the "attention" signal, i.e., AOM 35 has so-called attention handlers. For facilitating handling the attention aspect of a device-state transition signal, AOM 35 has a plurality of control tables 36. The device-state transition signal has with it identification of subsystem 16 as well as the address of device 18 which supplied the device transition signal. All of this information is transferred by IOS to AOM 35, as indicated by the arrow leading from tables 40 to vector table 41. Vector table 41 does not contain such supplied information; rather the information is kept with the IOS 13 request, as is usual for programs that execute requests received from other programs. AOM, upon receiving that information, examines vector table 41 for eventually finding the correct unit control block (UCB) which defines and identifies the device 18 sending the device transition signal. Within vector table 41, the several vectors are address pointers to other tables. Of present interest is the pointer to configuration table 45 for storage subsystem 16. Arrow 46 indicates that other control blocks are provided as configuration tables for other subsystems not shown in FIG. 1. Each of the storage subsystems, such as subsystem 16, has a separate subsystem status SS control block 47. Translation of the information received with the device-state transition signal by AOM 35 selects which of the address vectors in table 45 are used. AOM 35 then accesses the addressed SS control block 47. Upon such access, AOM 35 reads another address or pointer to the device tables 50. Note that the device 18 address was furnished with the device-state transition signal and is with the device-state transition signal request in AOM 35.

For purposes of explanation, assume that the device-state transition signal was supplied by a primary device 18 in a group of such devices. Table entry 50-1 contains two address fields, 52 and 55. Address field 52 contains the address to the unit control block (UCB) (not a part of tables 36, rather UCB's are a part of tables 40, as indicated by dashed line box 40) for the device described by table entry 50-1. FIG. 3 shows fields 86, 87 for indicating whether table entry 50-1 identifies a primary or secondary device 18. On the other hand, field 55 contains the address pointer to a second UCB representative of a paired device within the group of devices and described by another device table entry in 50. Arrows 54 and 56 respectively represent the pointing action of the fields 52 and 55 to two UCB's, 53 and 57. Each UCB, in addition to information defining a device 18, as is well known, contains an offset pointer to an entry in configuration table 45. Such offset pointer is a relative address of the UCB SS control block 47 within the configuration table 45.

Upon receipt of a device-state transition signal, AOM 35 knows the device 18 subsystem address, but does not know the internal host address for unit control block representing the device to the host. Access to the UCB is necessary for controlling the operation of the device. The UCB address is found by generating access to the configuration table 45, then accessing the SS control block 47 for the subsystem 16, then the device table 50 representative of the device 18 which sent the device transition signal. Device table 50 contains pointers to the two UCB's representing the two devices 18 in the group of devices and identifies which is the primary device and which is the secondary device.

On the other hand, when a secondary device of a group, whose address is not known to host processor 10 as a secondary device in the group, sends a device transition signal, the above-described addressing for the device follows the same path in the FIG. 2 illustration. Table entry 50-2 can be for a secondary device associated with a primary device, such as represented in device table entry 50-1. Device table entry 50-2 also has primary and secondary device address pointers for the UCB's as represented by dashed line arrows 61 and 62. Device tables 50 are the structures in a host which show the paired duplex device configuration of subsystem 16.

Subsystem 16 may send responses to host processor 10 relating to asynchronous operations. Further, the application programs 11 will be sending asynchronous commands to the subsystem 10. In both events, AOM 35 receives information from IOS 13 regarding the asynchronous operations. In such an event, the information supplied along with the asynchronous command accesses the vector table 41 for obtaining the address of the "async queue" header 42. There is one async queue header 42 for each AOM 35. The queue header in turn defines and identifies the location of the various async queues 43 contained within AOM 35. AOM 35 then manages the subsystem 16 asynchronous operation based upon the informational content within the async queues 43, i.e., ensures that the asynchronous operations being started have received a complete signal. Various timeouts may be employed for ensuring the completion of asynchronous operation as is known in the art.

FIG. 3 illustrates fields of interest in the host control blocks 36 for the subsystem 16. In SS control block 47 field control 70 contains self-identifying data of a control block as is usual, together with a length indicator of the control block, plus any control flags that may be desired. SSID 71 contains the subsystem 16 identification. Link field 72 contains forward and backward pointers for linking all SS control block 47 for creating a doubley-linked link list. DVEPTR 73 is a pointer to device table 50 corresponding to the control block entry. ConFIG. 74 contains subsystem 16 configuration data. AOM 35 maintains the status and updates and creates each SS control block 47.

A device table 50 entry is next described. Number field 80 includes current version number and revision number of the device table, plus some self-identifying data which is not necessary for an understanding of the present invention. UCBPTR 81 is the address pointer to the UCB 57 of the subsystem device represented by the device table entry. UCBPTRM 82 is the address of the UCB 57 of the mate or other device 18 within the group of devices. If the device identified by the entry is in a simplex mode, then UCBPTRM 82 is null or all zeros. ConFIG. 83 contains data about the device identified by the entry. It includes channel connection addresses and director device connections of the device identified in the entry. Field cache 84 contains data about the caching status of the device, FW 85 contains status about the fast write status for the device, P bit 86 indicates that the device identified by the entry is a primary device and bit S 87 indicates that the identified device is a secondary device. STAT 88 indicates the status of the group of devices. 00 indicates that both devices are available in the group, 01 indicates that the group status is being established for dual mode copying of data, 10 indicates the devices are in a fail duplex mode, and 11 is not used. CCA 89 is the channel connection address of the device identified by UCBPTRM 82. Bits P 86 and S 87 have to have different values if a duplex pair is established.

Figure 4:
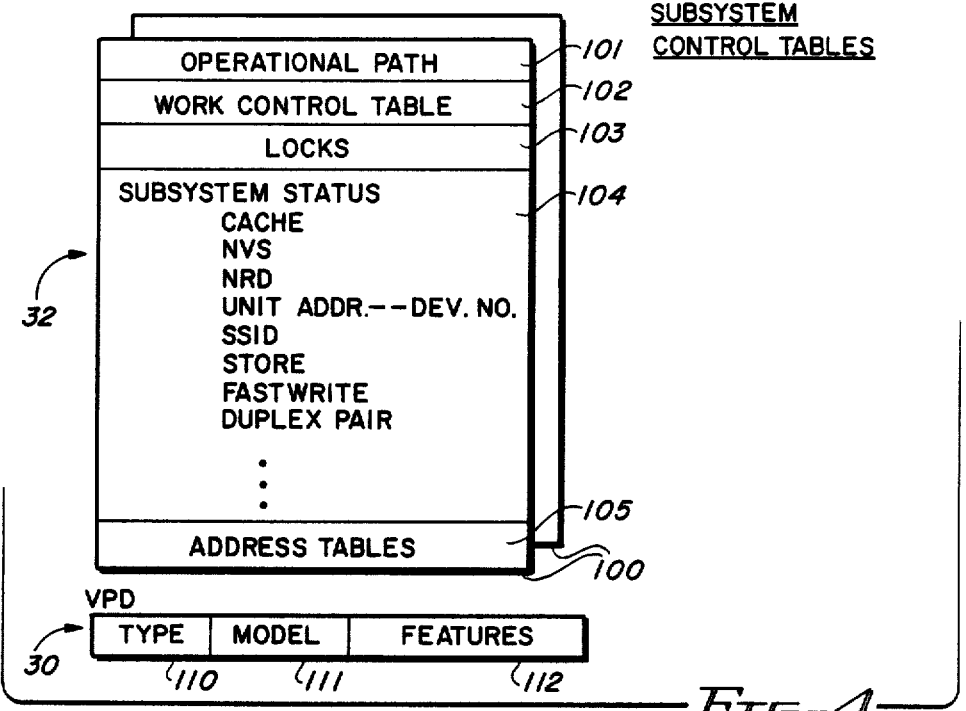
FIG. 4 shows tables for a subsystem with which the present invention may be used.

FIG. 4 illustrates tables within control unit 17 which are maintained by the various storage directors 25. JAS 32 is a plurality of tables in control unit 17 used for maintaining the host to device interface and implementing asynchronous operations, including dual copy operation. Fields 101 contain the operational data about the devices 18. Work control elements 102 within the work control table identify the device operations to be performed. Comparison of operational data 101 with work control table 102 by the subsystem 16 determines the status of the asynchronous operation with respect to the work to be performed. Lock structures 103 contain the usual device 18 locking keys for access control and preserving data integrity in the shared resources. Subsystem status 104 contains the current operational status of the cache 28, nonvolatile store (NVS) 29, nonretentive date (NRD), the unit address and the device number of the devices 18, the subsystem storage identification (SSI), which is the same as indicated in SSID 71 of FIG. 3 within the host processor. The status of the subsystem store stores the JAS 32, cache 28, MSG 31 and other control tables usable by the storage director 25. Fast write status relates to the operational status of NVS 29 in the fast write mode. The duplex pair indicates the status of the various groups of devices 18, also referred to as duplex pairs. Address tables 105 contain the translations of the device addresses as described in document incorporated by reference commonly assigned co-pending application for U.S. Pat. Ser. No. 089,151, filed Aug. 25, 1987. In VPD 30, the type of control unit 17 that is controlling subsystem 16 is shown in field 110. The model number is stored in field 111 and the various features of the control unit 17 are stored in field 112. Such features relate to NVS, NRD and the like. The status of NRD can be best understood by referring to the Hartung patent, incorporated by reference.

Figure 5:
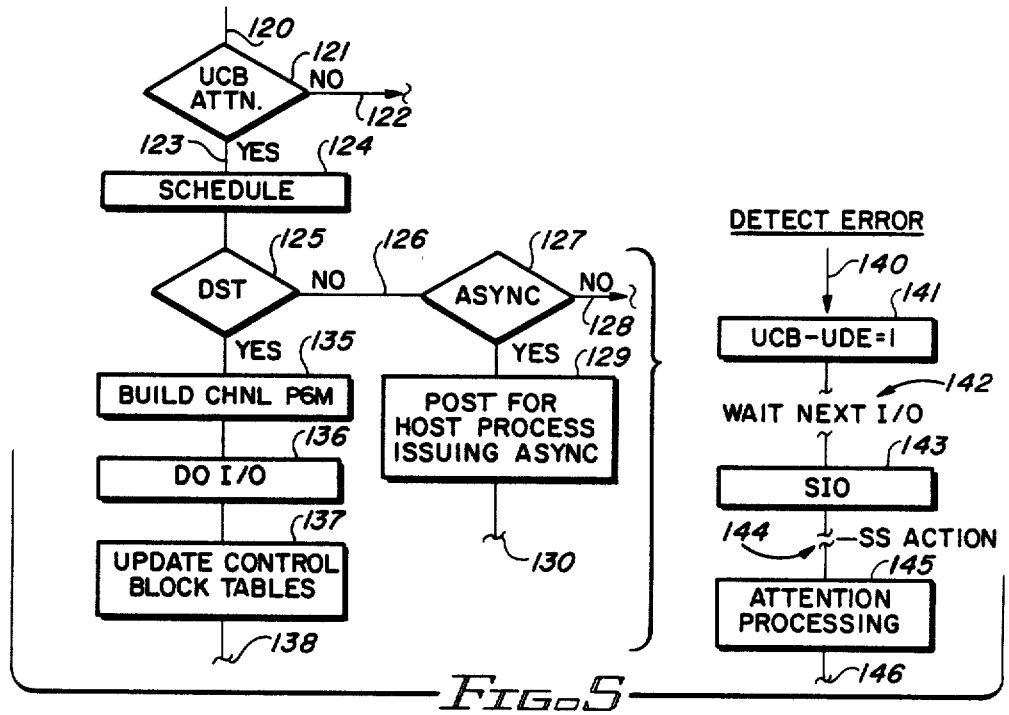
FIG. 5 shows a set of machine operations of a host processing which is using an embodiment of the present invention.

FIG. 5 illustrates the flow of control within AOM 35 after it receives the information and request from IOS 13, such as receiving an untagged interrupt (device-state transition signal) at 120. At step 121, AOM 35 determines whether or not a UCB attention signal was received with the information from IOS 13. If not, other functions are performed as indicated by arrow 122. However, if a UCB attention signal has been received, i.e., such as a part of a device transitional state signal, then, following logic path 123, AOM schedules obtaining the attention data at step 124. Such attention data will include the attention sending device 18 address as well as other information associated with the attention as described above and in the documents incorporated by reference. At step 125, AOM determines whether or not the attention signal is a part of a device-state transition (DST). If not, then AOM 35 follows logic path 126 to step 127. In step 127, AOM 35 determines whether or not the attention signal (not a device-state transition) relates to an asynchronous command as defined in the Hartung patent, incorporated by reference. If not, AOM 35 proceeds along logic path 128 to return control of the attention signal to IOS 13. However, when an asynchronous operation is detected at step 127, AOM 35 proceeds to step 129 for posting the message to the host process issuing the async (asynchronous) operation request; that is, an entry is made in one of the MVS tables 40 associated with the user program or application program 11, which originally requested the asynchronous input/output operation in a chain of channel command words (CCW). Then at exit 130 AOM 35 proceeds to other steps or returns the control of the processor 10 to IOS 13.

When host processor 10 at step 125 detects a DST, it proceeds to steps 135 through 137. At step 135 a channel program (chain of CCW's) is built to retrieve data from subsystem 16 required for the host processor as indicated in the detected DST. The actual request by host processor 10 to subsystem 16 for the data occurs in step 136 followed by the subsystem 16 reply. Then at step 137, the host processor 10 updates the tables 36, such as table 50 for identifying all of the devices 18 in a group or duplex pair. Upon completion of these actions, which are time interleaved with other processor functions as is well known, host processor 16 proceeds to other activities at line 138. The details of steps 135 through 137 are shown in simplified form in FIG. 6.

As supplementary informatio to AOM 35 operations, if an error in any processing is detected by AOM 35 using known program error detection methods, certain flags are set. Following detection of the error, AOM 35 follows logic path 140 to access the UCB 57 associated with the addressed device 18. Within the UCB 57, AOM 35 accesses a field termed UDE and sets that field to unity for indicating the detected error. Then, at point 142 host processor 10 waits for the next I O operation to be started by some function within host processor 10. Upon the next SIO (start input/output operation), as represented by numeral 143, host processor 10 supplies a chain of commands to subsystem 16 to fetch the data associated with the error or with the devicestate transitional signal. Such SIO requires known subsystem action represented by numeral 144. When the subsystem 16 supplies the requested data associated with the attention signal, host processor 10 adds step 145 to complete the attention processing. Following the attention processing, AOM 35 proceeds to other operations, as indicated by numeral 146.

Figure 6:
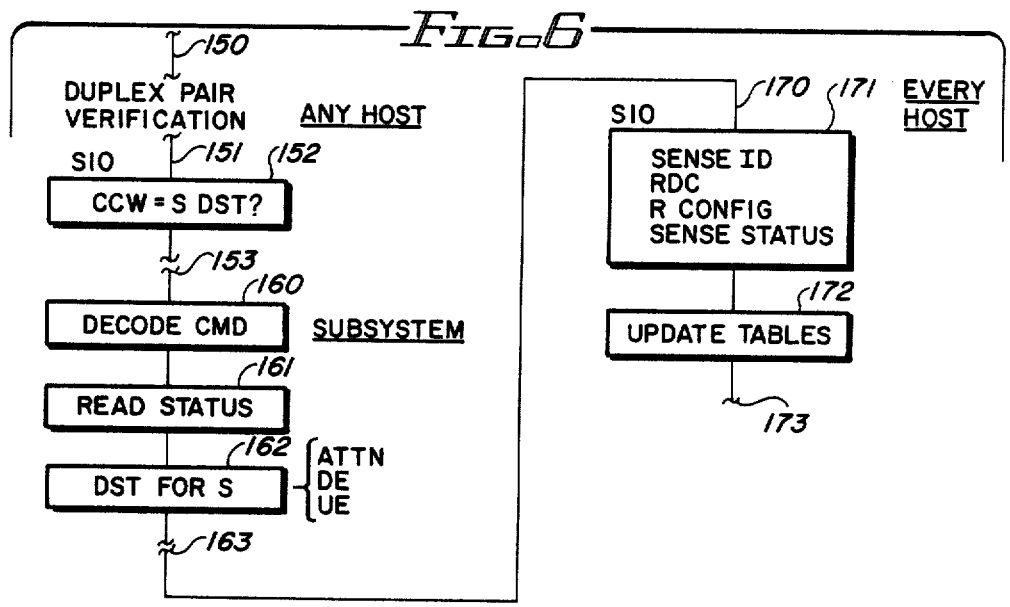
FIG. 6 shows, in simplified form, machine operations usable to implement one aspect of the present invention.

The machine process for verifying a duplex pair (group of devices 18) is shown in FIG. 6. Any of the host processors 10, at line 150, may institute a duplex pair verification. An SIO is issued to subsystem 16 at line 151. Included in the chain of commands, represented by numeral 152 are CCWs requesting the status S of the pair and whether or not a device-state transition occurred (DST). The CCWs are transmitted to the subsystem as represented by numeral 153.

The subsystem, at step 160, decodes the received command contained in the CCWs used by the host processor 10. At step 161, subsystem 16 reads the status from JAS 32. Then, at step 162, a device-state transition signal for S is supplied to all of the host processors, as indicated by numerals 162 and 163. The DST includes the attention signal, device end signal and unit exception signal.

The device-state transistion signals are always supplied to each and every host processor connected to subsystem 16. Every host receives the DST signal as represented by numeral 170. In response to the received DST, each and every host has an AOM 35, which responds to the host processor IOS 13 to perform the functions described in FIG. 5, using the control tables of FIGS. 3 and 4 to generate a CCW chain to issue commands to the subsystem for retrieving data for updating the control tables in each and every one of the host processors. Chains of cómmands usually associated with an SIO for obtaining this information, includes a "sense ID" command, a "read device characteristic" command, which causes the subsystem 16 to supply the device 18 characteristics of the addressed device, "read configuration" (r-config) data which fetches the configuration data from JAS 2 and "sense subsystem status" command. Upon receipt of the sense information by each of the respective host processors 10, the host processors 10 at step 172 update their respective tables to reflect the current status of subsystem 16. Then, each of the respective host processors proceed to other operations, as indicated by numeral 173.

While the invention has been particularly shown and described with reference to its preferred embodiments thereof, it will be understood by those skilled in the art that various changes in form and details may be made therein without departing from the spirit and scope of the invention.

What is claimed is:

1. In a method of operating a multiple host processor data processor system wherein a plurality of host processors are commonly connected to a peripheral subsystem having a programmed control unit and a plurality of attached peripheral devices, path address means in the subsystem for accessing the devices from the programmed control unit, each of the peripheral devices having means for performing host related data processing functions which are commanded by any one of the host processors, a fast access cache in the programmed control unit for storing data during data transfer operations between any of the commonly connected host processors and addressed ones of the devices, the host processors accessing data areas in the cache and in the peripheral devices via addresses of the devices, said addresses of the devices including said addresses with paths not being individually and separately addressable by the host processors, each of the commonly connected host processors having a unit control block for and describing the peripheral devices and control tables describing current configuration and status of the peripheral subsystem;

the steps of:
grouping less than all of said peripheral devices into one or more logical groups of primary and secondary devices, making said primary devices directly addressable by any of said commonly connected host processors and making said secondary devices not directly addressable by said host processors;
in each of the commonly connected host processors establishing a device table for each of the devices, which tables are separate from the unit control blcoks, storing the addresses of the peripheral devices of the same logical group to which the peripheral device belongs and indicating in each device table whether each of the peripheral devices are primary or secondary devices;
in said peripheral subsystem retentively storing identifications of said logical groups of devices, the addresses of the devices in said logical groups and indicating which of the devices are primary or secondary devices, and status of said cache and programmed control unit;
changing the statut of a peripheral device, programmed control unit or cache of the peripheral sybsystem from within such peripheral subsystem, retentively storing in said subsystem the changed status;
sending an untagged interruption signal from the control unit which identifies a one of the peripheral devices affected by such change in status and indicating in the interruption signal that a device-state transition has occurred;
in each of the commonly connected host processors receiving said untagged interruption signal, operating the host processors to respond to said interruption signal to command the peripheral subsystem to supply status about the device identified in the interruption signal and status of control unit or cache irrespective of what change in status occurred in the subsystem; and
operating the peripheral subsystem to respond to the command to send the change in status to the commanding host processor, then operating the host processor to update its UBS's and control tables to reflect the change in subsystem status.

2. In the method set forth in claim 1, further including, the steps of:
establishing a configuration table for the peripheral subsystem including first and second address pointers;
establishing a subsystem control block having a plurality of entries, one of the entires being for each of the devices in the peripheral subsystem and having a third address pointer, making said first address pointer point to the host processor address at which the subsystem control block is established;
making the third address pointer in the entires of the subsystem control block point to the device table established for the device for which the subsystem control block entry was made, making fourth and fifth address pointers in each of the device tables;
establishing one unit control block (UCB) for each device of the subsystem and including a sixth address pointer in said UCB, making said sixth address pointer point to the entry in said configuration table which points to the subsystem control block;
making each of the fourth address pointers point to a UCB established for the device represented by the device table and making each of the fifth address pointers point to a UCB established for a device in the same logical group of devices to which the device belongs; and
establishing an asynchronous operation queue for the subsystem and making the second address pointer point to the asynchronous operation queue.

3. In the method set forth in claim 2, further including the steps of:
generating in the host processor a request for a subsystem asynchronous operation command, establishing an entry in the asynchronous operation queue for the operation command and sending the command to the subsystem; and
receiving from the subsystem an interruption signal including said device-state transition indication for a first one of the devices, then accessing an UCB via said configuration table, subsystem table and device table for a device other than said first one device and performing an operation related to said other device.

4. In a method of operating a peripheral subsystem having a plurality of addressable peripheral devices and a programmed control unit commonly connected to the peripheral devices;

the steps of:
grouping some of the peripheral devices into redundant device groups;
making one of the peripheral devices in each of the groups a primary device and all the rest of the peripheral devices in each group secondary devices;
removing the capability of all secondary devices from being addressable by addresses received by the subsystem from outside the subsystem and within the subsystem making all of the secondary devices addressable through the primary device in the same group;

retentively storing identification and status information of all said groups and peripheral devices assigned to each said group;

receiving into the subsystem a command for a primary device requesting the address of said secondary devices within the group; and for all of the secondary devices within the group, sending an untagged interrupt to outside the system with the respective address of the secondary devices for indicating that the secondary devices are in the group with the primary device receiving said command.

5. In a peripheral subsystem which is attached to one or more host processors and having a plurality of addressable peripheral devices connected to a shared programmed control;

status and configuration means in the subsystem connected to the peripheral devices and to the programmed control for retentively storing configuration data for the subsystem, including configuration data grouping predetermined ones of the peripheral devices into groups with each group having a primary device and one or more secondary devices, means in the programmed control to maintain addressability of each primary device and making addressability for each of the secondary devices limited to first addressing the primary device in said groups, respectively; and command execution means in the programmed control for actuating said secondary devices in any one of the groups to emit device-state transition signals to all the host processors as an indication that such secondary devices are in the same group as the primary device in such group, and means in the programmed control for transferring each state transition signal to the host processor.

6. For use in a programmable host processor having addressable storage locations for storing program indicia and control data indicia and means for addressing the addressable storage locations and for controlling asynchronous operations of a connected peripheral subsystem, a set of program indicia having program steps and associated control data structures, including in combination;

vector table indicia containing first and second host processor addresses for first and second control data indicia and being located at a given one of the addressable storage locations;

configuration table indicia at the first address and containing a third address in a plurality of control data entries respectively for a plurality of peripheral subsystems with a first entry being for a first peripheral subsystem having a first subsystem identification (SSID) and being located at a given address offset within the configuration table indicia;

a plurality of subsystems control block indicia located at the third address with subsystem control block indicia for the first peripheral subsystem and containing a fourth address pointer;

a plurality of device table indicia with one device table for each device attached to a host processor within the first peripheral subsystem and having fifth and sixth address pointers, the device table indicia being located at said fourth address;

a plurality of unit control blocks (UCB), one for each device attached to the host processor and each UCB having the second address and entry offset for the peripheral subsystem in which the respective device exists; each of the control blocks being located at said fifth address for a respective one of the device table indicia, said sixth addresses having a same range of addressability for the UCB's as said fifth addresses, predetermined ones of the device tables having a fifth and sixth address with the fifth and sixth address in each of the respective device tables pointing to a different UCB and others of the device tables only having a fifth address;

IOS program indicia for communicating with a subsystem and being coupled to said vector table indicia and having program indicia for receiving SSID signals with interruption signals from a subsystem, and said coupling to the vector table indicia including means for passing the SSID signals thereto; and AOM program indicia coupled to the IOS program indicia and to all of the control data indicia and having indicia for accessing the vector table indicia for reading the SSID signals, then for selecting a subsystem control block based on the SSID signals and accessing a device table indicia for accessing a fifth and sixth address for identifying a group of UCB's addressable by both fifth and sixth addresses whereby a group of devices in the subsystem can be identified.

* * * * *